(12) United States Patent
Maghoul

(10) Patent No.: US 8,037,070 B2
(45) Date of Patent: Oct. 11, 2011

(54) BACKGROUND CONTEXTUAL CONVERSATIONAL SEARCH

(75) Inventor: Farzin Maghoul, Hayward, CA (US)

(73) Assignee: Yahoo! Inc., Sunnyvale, CA (US)

( * ) Notice: Subject to any disclaimer, the term of this patent is extended or adjusted under 35 U.S.C. 154(b) by 577 days.

(21) Appl. No.: 12/146,227

(22) Filed: Jun. 25, 2008

(65) Prior Publication Data

US 2009/0327263 A1    Dec. 31, 2009

(51) Int. Cl.
*G06F 7/00* (2006.01)
*G06F 17/30* (2006.01)

(52) U.S. Cl. ......... 707/736; 707/758; 707/767; 707/769

(58) Field of Classification Search ............. 707/736, 707/750, 755, 738, 748, 749, 758, 769, 767, 707/770
See application file for complete search history.

(56) References Cited

U.S. PATENT DOCUMENTS

| | | | |
|---|---|---|---|
| 6,311,182 B1 | 10/2001 | Colbath et al. | |
| 6,618,726 B1 | 9/2003 | Colbath et al. | |
| 7,076,431 B2 | 7/2006 | Kurganov et al. | |
| 7,426,268 B2 * | 9/2008 | Walker et al. | 379/266.01 |
| 7,783,486 B2 * | 8/2010 | Rosser et al. | 704/270 |
| 2004/0167847 A1 * | 8/2004 | Nathan | 705/37 |
| 2005/0278179 A1 | 12/2005 | Overend et al. | |
| 2007/0011133 A1 | 1/2007 | Chang | |
| 2007/0041545 A1 * | 2/2007 | Gainsboro | 379/188 |
| 2007/0061314 A1 | 3/2007 | Rosenberg | |
| 2008/0198978 A1 * | 8/2008 | Olligschlaeger | 379/85 |
| 2008/0201143 A1 * | 8/2008 | Olligschlaeger et al. | 704/235 |

OTHER PUBLICATIONS

Ceaparu, Irina, "Universal Usability in Practice: Telephone Based Access to the Web—Speech Recognition," retrieved Jun. 25, 2008, from http://www.otal.umd.edu/uupractice/phone (10 pages).
EeTimes, "Speech recognition heads to Web via XML," retrieved Jun. 25, 2008, from http://www.eetimes.com/story/OEG20010327S0066 (Mar. 27, 2001, 5 pages).
Nuance, "Dragon Naturally Speaking 9—Personal & Home Users," retrieved Jun. 25, 2008, from http://www.nuance.com/naturallyspeaking/home (2 pages).
Nuance, "Mobile Devices," retrieved Jun. 25, 2008, from http://www.nuance.com/mobiledevices (2 pages).
Nuance, "Mobile Speech Platform—Nuance Mobile Navigation," retrieved Jun. 25, 2008, from http://www.nuance.com/mobilenavigation (2 pages).

(Continued)

*Primary Examiner* — Don Wong
*Assistant Examiner* — Merilyn Nguyen
(74) *Attorney, Agent, or Firm* — Nathan O. Greene; Brinks Hofer Gilson & Lione

(57) ABSTRACT

A method of generating search queries based on digitized audio from conversations, including: providing a database having a global hot-list of universal popular keywords or phrases and a personalized entity list comprising keywords and phrases used with a frequency above a determined threshold value in conversations involving a user; monitoring a conversation between at least two people, including the user; identifying words or phrases in digitized audio of the monitored conversation through speech recognition; comparing the identified words or phrases to the keywords and phrases in the database to find any matches; generating a search string, without the user requesting a search, based on words or phrases found to match the keyword or phrases stored in the database; submitting the search string to a search engine as a search query; and serving a set of search results returned by the search engine to a display device of the user.

25 Claims, 6 Drawing Sheets

OTHER PUBLICATIONS

Nuance, "Nuance Mobile Search," retrieved Jun. 25, 2008, from http://www.nuance.com/mobilesearch (2 pages).

Nuance, "Nuance Voice Control," retrieved Jun. 25, 2008, from http://www.nuance.com/voicecontrol/ (3 pages).

Nuance, "T9 Solutions," retrieved Jun. 25, 2008, from http://www.nuance.com/t9/t9nav/default.asp (2 pages).

Parus Interactive, "Unified Communications and Speech-Enabled Services," retrieved Jun. 25, 2008, from http://www.parusinteractive.com/company_information.aspx (2 pages).

Webley Systems and Indicast to Develop First Integrated Unified Communications and Voice Portal Service, "Webley's Industry-Leading Unified Communications Functionality and Indicast's Rich Audio and Data Content Will Be Integrated Under a Common Natural Speech Interface," retrieved May 22, 2008, from http://www.prnewswire.com/cgi-bin/stories.pl?ACCT=104&STORY=/www/story/10-25-2... (3 pages).

* cited by examiner

BACKGROUND CONTEXTUAL CONVERSATIONAL SEARCH

BACKGROUND

1. Technical Field

The disclosed embodiments relate generally to Internet web-browsing or searching for particular web pages based on keyword queries. More particularly, the disclosed embodiments relate to automatically generating search queries through speech recognition and contextual influence of a telephone (or other type of) conversation or other audio streamed over a telephone.

2. Related Art

Herein web-browsing is defined as finding commercial or informational documents or web-pages on the Internet (or World Wide Web ("Web")) associated with a given criteria of interest to users or browsers. The primary mechanism to search for specific web pages is to key in search strings of characters to a search engine or the equivalent in a commercially available browser. The searching provides a list of hits or matches, and the specific text or web pages can be displayed by linking to web pages thereof. Any of the listed web pages can be brought up on the screen by known methods, e.g. "pointing and clicking" on words that are "linked" (hypertext links) to classes of information desired and bringing up those web pages on the user's screen if desired or at least bring up the text on the user's screen if graphics are not available to the user. Such web-browsing can be done in general areas or in specific topical areas. The topical areas usually include topics like the weather, stocks, sports, finance, news, etc. in which specific search protocols with particular search requirements and formats have been developed.

Consumers and business people increasingly use mobile phones, wireless phones, or similar devices to web-browse the Internet in addition to routine phone voice communication. Conventional keyword-based searches run by these consumers and business people on telephones, however, is time consuming and imperfect formulation of the keyword terms oftentimes produces search results that lack relevancy to the information sought for by a person.

SUMMARY

By way of introduction, the disclosed embodiments relate to automatically generating search queries through speech recognition and contextual influence of a telephone (or other type of) conversation or other audio streamed over a telephone.

In a first aspect, a method is disclosed for generating search queries based on digitized audio from conversations, including: providing a database containing a global hot-list including universal popular keywords or keyword phrases and containing a personalized entity list including keywords and keyword phrases used with a frequency above a determined threshold value in conversations involving a user; monitoring a conversation between at least two people, at least one of which is the user; identifying words or phrases in digitized audio of the monitored conversation through speech recognition; comparing the identified words or phrases to the keywords and keyword phrases in the database to find any matches; generating a search string, without the user requesting a search, based on words or phrases found to match the keyword or keyword phrases stored in the database; submitting the search string to a search engine as a search query; and serving a set of search results returned by the search engine to a display device of the user.

In a second aspect, a method is disclosed for generating search queries based on a media audio stream played over a media device of a user, including: digitizing any analog words detected in an audio stream of a video or other media played over a media device of a user; monitoring digitized conversations of the user and at least one other person; providing a database containing a global hot-list including universal popular keywords or phrases and containing a personalized entity list including keywords and keyword phrases used with a frequency above a determined threshold value in the monitored conversations involving the user; identifying words or phrases in the digitized audio stream through speech recognition; comparing the identified words or phrases to the keywords and keyword phrases in the database to find any matches; generating a search string, without the user requesting a search, based on words or phrases found to match the keyword or keyword phrases stored in the database; submitting the search string to a search engine as a search query; and serving a set of search results returned by the search engine to a display device of the user.

In a third aspect, a system is disclosed for generating search queries based on digitized audio from a conversation between at least two people, at least one of which is a user, including a memory to store computer programmable code and a processor to execute the computer programmable code stored in the memory. A database stores entity lists including a global hot-list with universally popular keywords and keyword phrases and an entity list with keywords and keyword phrases used with a frequency above a determined threshold value in conversations involving the user. An identifier identifies words or phrases in the digitized audio of the conversation between the user and at least one other person through speech recognition. A comparator compares the identified words or phrases to the keywords and keyword phrases stored in the database to locate any matches. A search string generator generates a search string, without the user requesting a search, based on words or phrases found to match the keyword or keyword phrases stored in the database. The processor submits the search string to a search engine as a search query; and sends a set of search results returned by the search engine to a display device of the user.

In a fourth aspect, a system is disclosed for generating search queries based on a media audio stream played over a telephone of a user, including a memory to store computer programmable code and a processor to execute the computer programmable code stored in the memory. A database stores entity lists including a global hot-list with universally popular keywords and keyword phrases and an entity list with keywords and keyword phrases used with a frequency above a determined threshold value in conversations involving the user. A digitizer digitizes any analog words detected in an audio stream of a video or other media played over a telephone of the user. An identifier identifies words or phrases in the digitized audio stream through speech recognition. A comparator compares the identified words or phrases to the keywords and keyword phrases stored in the database to locate any matches. A search string generator generates a search string, without the user requesting a search, based on words or phrases found to match the keyword or keyword phrases stored in the database. The processor submits the search string to a search engine as a search query, and sends a set of search results returned by the search engine to a telephone of the user.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

By way of introduction, the disclosed embodiments relate generally to systems and methods for Internet web-browsing or searching for particular web pages based on keyword queries. More particularly, the disclosed embodiments relate to automatically generating search queries through speech recognition and contextual influence of a telephone conversation or other audio streamed over a telephone. Note that web-enabled telephones include packet switching capability for access to the Internet. Similarly as discussed above, conventional keyword-based searches run on telephones take time and imperfect formulation of the keyword terms oftentimes produces search results that lack relevancy to the information sought for by a user.

Figure 1:
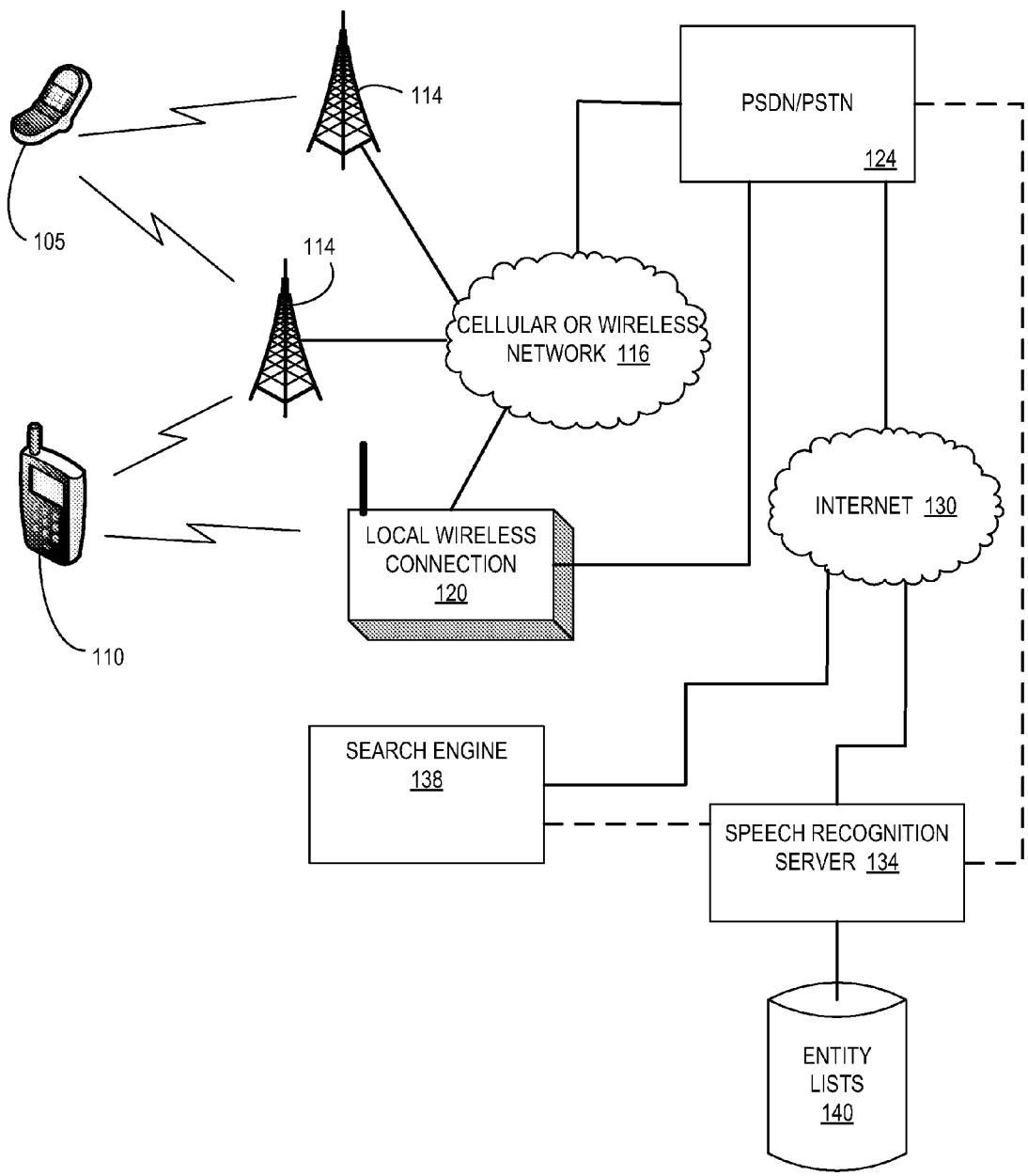
FIG. 1 is a diagram of an exemplary system for automatically generating, on various types of telephones, search queries based on a user conversation.

FIG. 1 is a schematic block diagram of an exemplary system 100 for automatically generating, on various types of telephones, search queries based on a user conversation, which may be over a telephone. A mobile phone 105 and a wireless (or smart) phone 110 (variably referred to as telephones or handsets 105, 110 herein) are some of the types of telephones over which the embodiments disclosed herein may be implemented. The telephones 105, 110 may wirelessly communicate with base transceiver stations 114, also referred to as cell sites. Note that the scope of these embodiments is not intended to be limited by the type of phone used, except where specifically indicated. Conversations may also be obtained through means other than a telephone, such as through a tape or CD recorder, as would be apparent to one of ordinary skill in the art.

The base transceiver stations 114 communicate through a cellular or wireless network 116, which may include various pieces of switching hardware such as routers, switches, hubs, etc. The cellular network 116 may communicate through, or be coupled with, a Public Switched Data (and/or Telephone) Network (PSDN/PSTN) 124. Herein, the phrase "coupled with" is defined to mean directly connected to or indirectly connected through one or more intermediate components. The system 100 may also include a local wireless (or cordless) connection 120 through which the telephones 105, 110 may obtain network communication for voice and data. The local wireless connection 120 is coupled with the wireless network 116 and/or is coupled with the PDSN/PSTN 124. The PSDN/PSTN 124 may be coupled with an Internet 130 or other network such as an intranet or a local area network (LAN) for communication with a speech recognition server 134 and a search engine 138 that likewise have Internet (or "Web") 130 access. As shown by the dashed line, however, the PSDN/PSTN 124 may directly communicate with the speech recognition server 134 without needing to first pass data through the Internet 130. The speech recognition server 134, discussed in more detail below, may include an entity lists database 140, which includes keywords or keyword phrases used frequently enough in telephone conversation to be used for comparison with real-time digitized conversations.

The dialogue of wireless communication between handsets 105, 110 and the base transceiver stations 114 is a stream of digital data that includes digitized audio, except for the first generation analog networks. Digitization of such first generation analog networks has to take place elsewhere, such as at the speech recognition server 134. The technology that achieves the digitization depends on the system which a mobile phone operator has adopted, wherein the system 100 may support various different mobile phone operators. The technologies are grouped by generation. The first-generation systems started in 1979 with Japan, all of which are analog and include AMPS and NMT. Second-generation systems started in 1991 in Finland, and are all digital and include GSM, CDMA, and TDMA. Third-generation (3G) networks, which are still being deployed, began in Japan in 2001. They are all digital, and offer high-speed data access in addition to voice services and include W-CDMA (known also as UMTS), and CDMA2000 EV-DO. China will launch a third generation technology on the TD-SCDMA standard. Operators use a mix of predesignated frequency bands determined by the network requirements and local regulations.

While short message service (SMS) is the most common form of digital communication over mobile phones, web-browsing and searching the Internet is quickly gaining popularity as more handsets 105, 110 are manufactured as web-enabled. There is more than one way to connect to the Internet using a mobile phone such as the handsets 105, 110. The most common technology used is Wireless Application Protocol (WAP) with its Wireless Markup Language (WML). WAP is used to deliver text and limited graphics to a small phone display. Phones have also been manufactured to offer voice access to the web through voice or speech recognition technology. One of such technologies is referred to in the telecommunications industry as Interactive Voice Response (IVR). Another example is called VoiceXML, a markup language for voice applications based on Extensible Markup Language (XML).

The two main approaches used for browsing the Internet 130 using speech recognition are voice browsers and screen readers. Screen readers are used to allow navigation of the screen presented by the operating system, using speech or Braille output. Voice browsers allow voice-driven navigation, some with voice-in and voice-out, and some allowing telephone-based web access. Voice browsers allow users to access the Web using speech synthesis, pre-recorded audio, and speech recognition. This can be supplemented by keypads and small displays. Complete hands free access to the Web through the voice browser, however, is especially useful in some contexts such as while driving an automobile, for telephone access to web pages where the telephone does not have a regular web browser, and for the visually impaired.

Currently, voice browsers generally require use of some sort of commands that must be recognized in order to execute the desired action as a regular web browser would on a personal computer. For instance, ConversaWeb requires speaking "saycons" to activate links. Also, "SpeecHTML" is a subscription service from Vocalis of Waterbury, Conn. that allows a participating site to provide telephone access using voice commands. Finally, Indicast also offers command-based, personalized audio access to information over the Internet. Furthermore, after a web session has ended and a user exits a voice browser, there is no access to search results generated from a search engine query; accordingly, it is difficult, if not impossible, to return to the original search results without going back into the voice browser to re-execute the original search, if it is remembered by a user.

Figure 2:
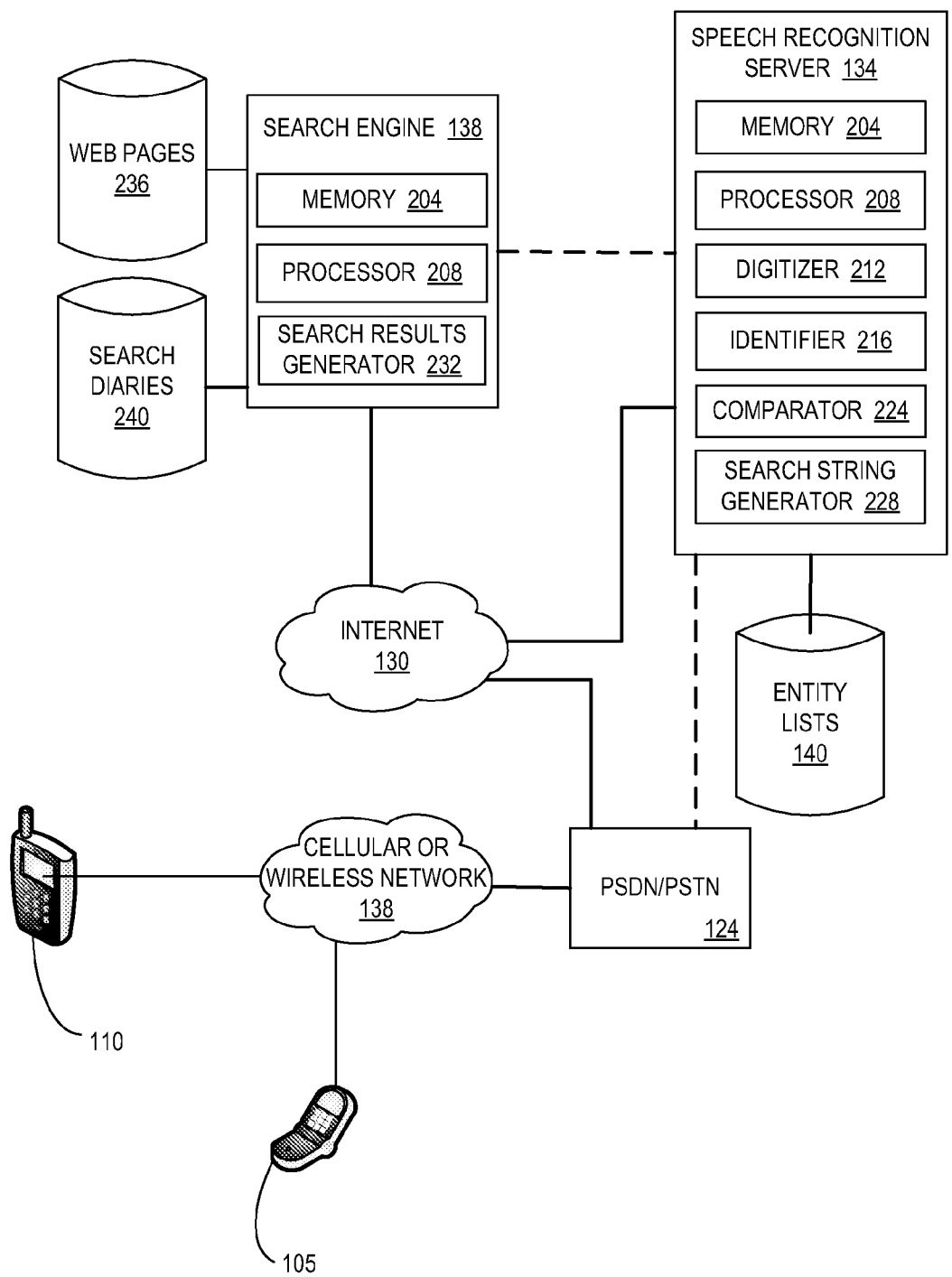
FIG. 2 is the diagram of FIG. 1 displaying details of implementation of a speech recognition server to generate queries from conversational speech and of a search engine to generate search results based on those queries.

FIG. 2 is the diagram of FIG. 1 displaying details of implementation of the speech recognition server 134 to generate queries from conversational speech and of the search engine 138 to generate search results based on those queries. The speech recognition server 134 may include a memory 204, a processor 208, a digitizer 212, an identifier 216, a comparator 224, and a search string generator 228, wherein one or more of the elements 212 through 228 may be included within the processor 208, and/or be executed by the processor 208 when software code is executed by the server 134. The search engine 138 may also include a memory 204, a processor 208, a search results generator 232, a web pages database 236, and a search diaries database 240. All other connections or possible connections are as were explained previously with reference to FIG. 1, regardless of whether the details are displayed in FIG. 2. Note also that the speech recognition server 134 may be included as an integrated part of the search engine 138, or may be directly coupled thereto, as indicated by the dashed line. Note that the elements (or modules) of the speech recognition server 134 and/or the search engine 138 may be executed through hardware, or a combination of hardware and software, with the use of the memory 204 and the processor 208.

When a person (variably referred to herein as a "user") is conversing with at least one other person over a telephone 105, 110, the audio data of the conversation passes through the local wireless connection 120 and/or the cellular or wireless networks 116 and gains access to the Internet 130, for instance, through the PSDN 124. In the alternative, the audio data may be communicated directly from the PSDN/PSTN 124 to the speech recognition server 134 without passing through the Internet 130, as indicated by the dashed line. As discussed previously, the wireless dialogue between the mobile telephone 105 and the transceiver base stations 114, for second and third generation networks, includes digitized audio. Accordingly, the digitizer 212 of the speech recognition server 134 may be required when receiving communication from a purely analog, first generation network. The digitizer 212 may also further digitize any audio that was insufficiently digitized before reception thereof, regardless of origin, to generate as many possible words or phrases that may be utilized by the speech recognition server 134 to generate search queries.

The identifier 216, or speech recognizer, may then identify words or phrases in the digitized audio of the telephone conversation through voice recognition technology such as IVR. The identifier 216 may include the IVR (or similar) application, a call processing system (not shown), and telephony and voice hardware (not shown) required to communicate with the PSDN/PSTN 124 network(s). A possible identifier 216 or speech recognizer includes that developed by Nuance Communications of Burlington, Mass. The Nuance engine capacity is measured in recognition units based on CPU type as defined in the vendor specification. The natural speech recognition grammars, e.g., that which a user can say that will be recognized by the identifier 216, were originally developed by Webley Systems, which partnered with EffectNet, both of which merged into Parus Interactive of Bannockburn, Ill. in 2001. Parus Interactive's Unified Communications solutions and services are Internet Protocol (IP)-based and powered by natural language voice recognition and Session Initiation Protocol (SIP) technologies. An integrated service creation platform (ISCP) allows Parus to rapidly deliver communications services.

Voice recognition technology can, for instance, detect pauses or stop words at which to insert natural breaks between possible keyword phrases. Stop words are words pre-selected by the voice recognition software designer that will be extracted from all recognized word strings as having no meaning in the context of a typical search string used to query the search engine 138. As search strings are to be generated automatically, without the need of using commands, such stop words may be left in as an exception in the case of a question or other phrase in which the stop word may be especially important, e.g., "Boy Scouts of America."

As mentioned, the entity lists database 140 contains keywords or keyword phrases used frequently enough in telephone conversation to be used for comparison with real-time digitized conversations. The entity lists database 140 may include at least two different sub-databases, such as a global "hot list" for tracking the most popular identified words or phrases in conversations of all users, and a personalized entity list for tracking the most frequently-used words or phrases as per individual users. The latter could be tracked according to identification of the telephone 105, 110 used by each user, either by a data signature from the telephone 105, 110 itself or through a registration process wherein the user opts-in to automatic query generation based on his or her conversations. The personalized entity list could include most anything, including movies, contacts in an address book, favorite restaurants, favorite news types, favorite travel destinations, favorite foods, celebrities, subjects of interest, and combinations thereof.

The comparator 224 may then compare the words and phrases identified through voice recognition with the extant keywords and keyword phrases saved in the various entity lists of the entity lists database 140. Based on hits indicating matches, the search string generator 228 may then automatically generate one or more search strings to submit to the search engine 138. The search string generator 228 may also take into account a context of the search strings, to include, but not limited to, words uttered in proximity to the search string but not included therein, a location of the mobile phone 105, 110 determined from a GPS device (see FIG. 3), a time stamp of the mobile phone 105, 110 and a detected gender of the user. The time stamp may be generated through network time protocol (NTP) built into the cellular or wireless network 116 which synchronizes the local time stamp of the phone's clock-calendar with NIST Internet Time Service (ITS) servers (not shown). Furthermore, although less accurate, the time stamp can be obtained directly through an on-board clock-calendar of a mobile phone that is not normally synchronized with a network clock.

By way of example, if a location is known, such as Washington D.C., the search string generator 228 may insert one or more additional terms, e.g., "Washington D.C." or zip code "20500" into the search string before it is sent to the search engine 138. Accordingly, if the user is discussing her favorite type of coffee in a conversation, a search string may be generated that reads "Coffee Shop and Washington D.C." Part of the search results that are returned would include the coffee shops in Washington D.C. with directions. In the alternative, if the user had just been discussing grocery shopping, use of the context of the conversation may lead the search string generator 228 to integrate the term "grocery store," resulting in a search string of "Coffee and Grocery Store in Washington D.C."

By way of an additional example, a user says "Let's go see Indiana Jones tonight." The comparator 224 may determine that Indiana Jones is a movie from the hotlist database of the entity lists database 140. The search string generator 228 may also identify the term "tonight" as a contextual word, indicating a specific date and time that is then included in the search query. The date and time, however, may be independently obtained or verified from NTP as discussed above. Having the time information in the search query subsequently affects the show times returned by the search engine 138. Furthermore, as discussed, the search string generator 228 may receive a location of the mobile phone 105, 110 and insert location information of the user, which may further limit search results to only a few of the nearest theaters.

After the search strings 228 are received by the search engine 138, the search results generator 232 generates a set of search results that most relevantly correlate to each search string, ranking the most relevant results highest. The search results of a conversation session are returned to the mobile telephone 105, 110 of the user for viewing and access by the user, and for storage in a search diary (326 of FIG. 3). The user may also optionally configure the search diary to be saved in the search diaries database 240 in relation to the user's identification by which that user may later access the search diary. The option of saving the search results remotely with the search engine 138 allows a user to increase the storage limit available for continuously-generated search results when compared with that available on a mobile phone 105, for instance. The search diaries database 240, advantageously, may also be accessible via a user account from a web page on a personal computer of the user, allowing perusal of relevant and interesting search results based on user conversations on a machine and browser more amenable to quicker linking and faster reading.

Figure 3:
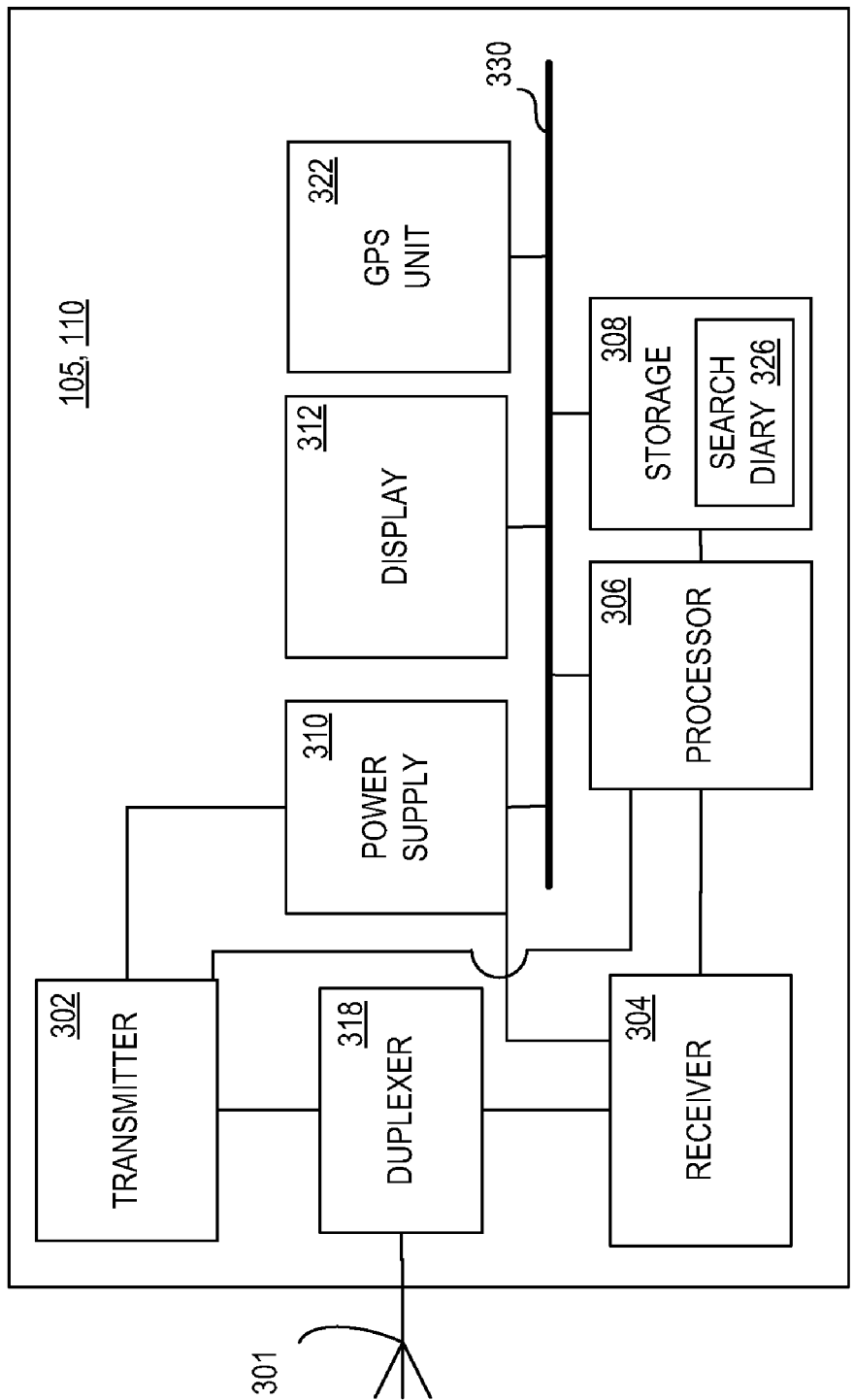
FIG. 3 is an exemplary telephone, shown as a mobile or wireless phone with global positioning capability, according to an embodiment of the present disclosure.

FIG. 3 is an exemplary telephone 105, 110, shown as a mobile or wireless phone with global positioning capability, according to an embodiment of the present disclosure. The mobile phone 105, 110 includes an antenna 301, a transmitter 302, a receiver 304, a processor 306, a storage 308, a power supply 310, a display 312, a duplexer 318, and a global positioning system (GPS) unit 322. The storage 308 may include a search diary 326, which is a continuously-updated record of automatically-generated search results according to the present disclosure. The search diary 326 may allow deletion of the oldest saved search results as the portion of the storage 308 allocated for is depleted, to make room for newer search results.

As shown in this embodiment, the processor 306, the storage 308, the power supply 310, the display 312, and the GPS unit 322 are coupled to a communications bus 330. The communications bus 330 is operable to transmit control and communications signals from and between the components connected to the bus 330, such as power regulation, memory access instructions, GPS location, and other system information. In this embodiment, the processor 306 is coupled to the receiver 304 and to the transmitter 302. One of skill in the art will appreciate that the processor 306 may include the GPS unit 322. Also, the antenna 301 could be configured to connect through the local wireless connection 120, to include a Wi-Fi connection, ect.

Figure 4:
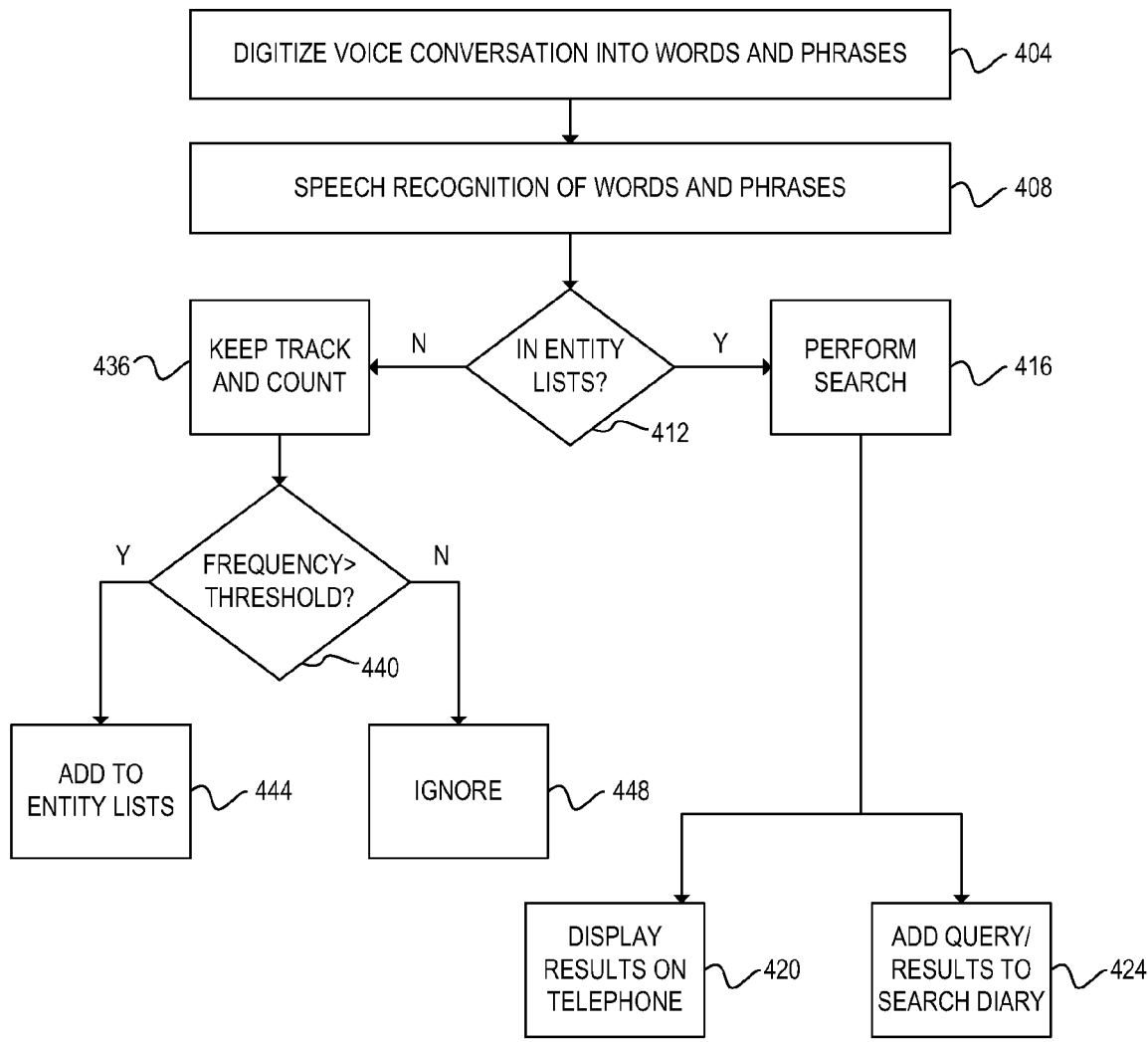
FIG. 4 is a flow chart of an exemplary method for automatically generating search queries based on an entity list that includes words used sufficiently often in conversation.

FIG. 4 is a flow chart of an exemplary method for automatically generating search queries based on an entity list that includes words used sufficiently often in conversation. At block 404, the speech recognition server 134 digitizes the voice conversation between the user of a telephone 105, 110 and at least one other person into words and phrases. At block 408, the speech recognition server 134 recognizes (or identifies) the words and phrases contained in the digitized audio of the voice conversation. At block 412, the speech recognition server 134 determines, through comparison, whether any of the recognized words and phrases are located in the entity lists database 140. If there are matches found, at block 416, the search string generated is sent to the search engine 138 to perform a Web search based thereon. At block 420, the search results are returned to the mobile phone 105, 110 for display thereon. At block 424, the search results and corresponding query are stored in the search diary 326, and optionally, in the search diaries database 240 of the search engine 138.

If there are no matches found at block 412, than at block 436, the search string of the query is tracked by incrementing a counter for the number of times a search for the same has been submitted to the search engine 138. This counting could take place either on the speech recognition server 134 or at the search engine 138. At block 440, the method asks whether the counter, representing the frequency with which the search string has been submitted to the search engine 138, is above a threshold value. If the answer is yes, at block 444, the search string (which could be one or more words) is added to each relevant entity list in database 140, including the global hotlist and/or the personalized entity list. If the answer is no, at block 448, the counter remains updated, but no further action is taken.

Figure 5:
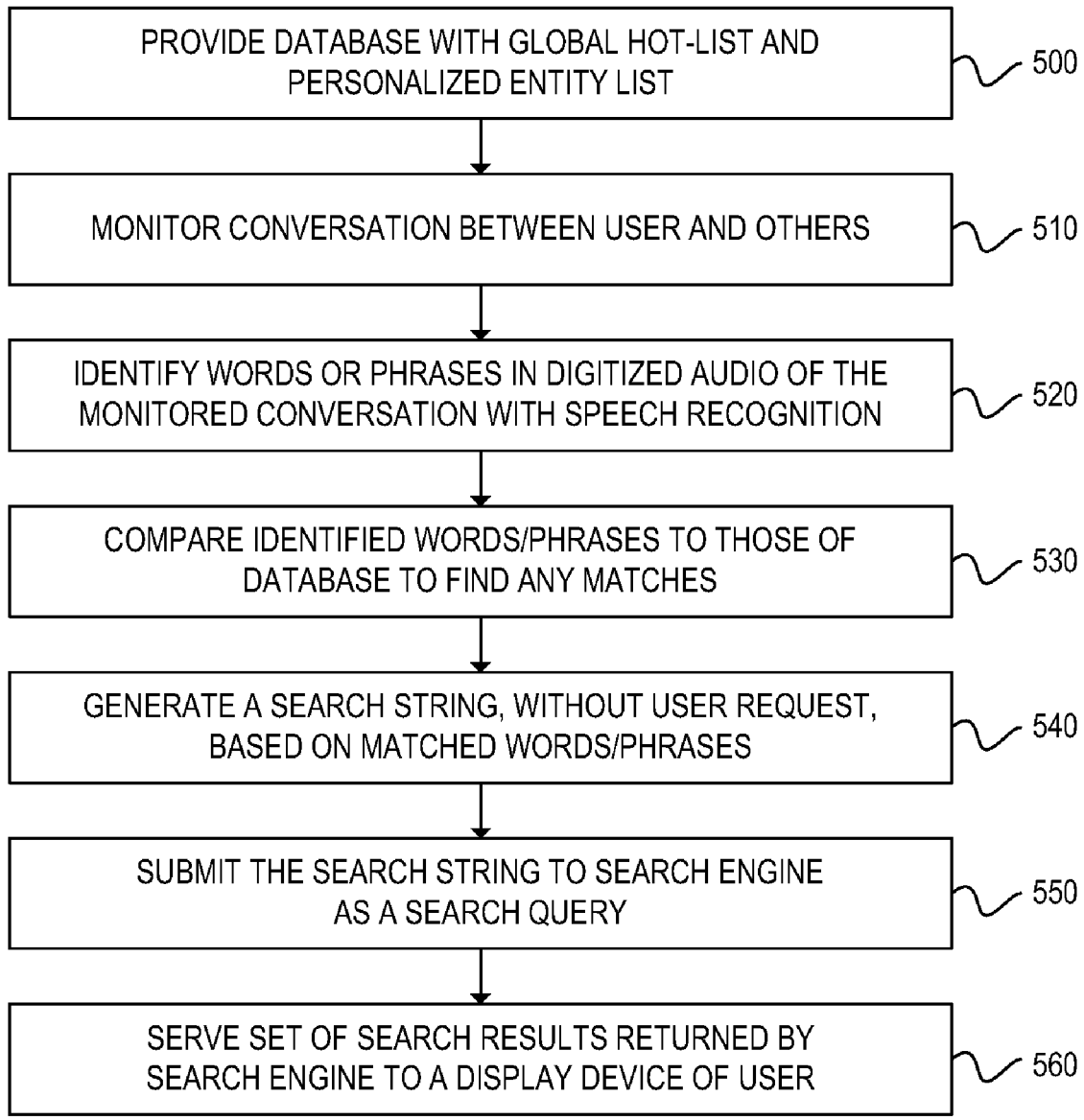
FIG. 5 is a flow chart of another embodiment of a method for automatically generating search queries based on words or phrases detected during a user conversation.

FIG. 5 is a flow chart of another embodiment of a method for automatically generating search queries based on words or phrases detected during a user conversation. The method provides, at block 500, a database containing a global hot-list including universal popular keywords or keyword phrases and containing a personalized entity list including keywords and keyword phrases used with a frequency above a determined threshold value in conversations involving a user. At block 510, the method monitors a conversation between at least two people, at least one of which is the user. At bock 520, the method identifies words or phrases in digitized audio of the monitored conversation through speech recognition. At block 530, the method compares the identified words or phrases to the keywords and keyword phrases in the database to find any matches. At block 540, the method generates a search string, without the user requesting a search, based on words or phrases found to match the keyword or keyword phrases stored in the database. At block 550, the method submits the search string to a search engine as a search query. At block 560, the method serves a set of search results returned by the search engine to a display device of the user.

Figure 6:
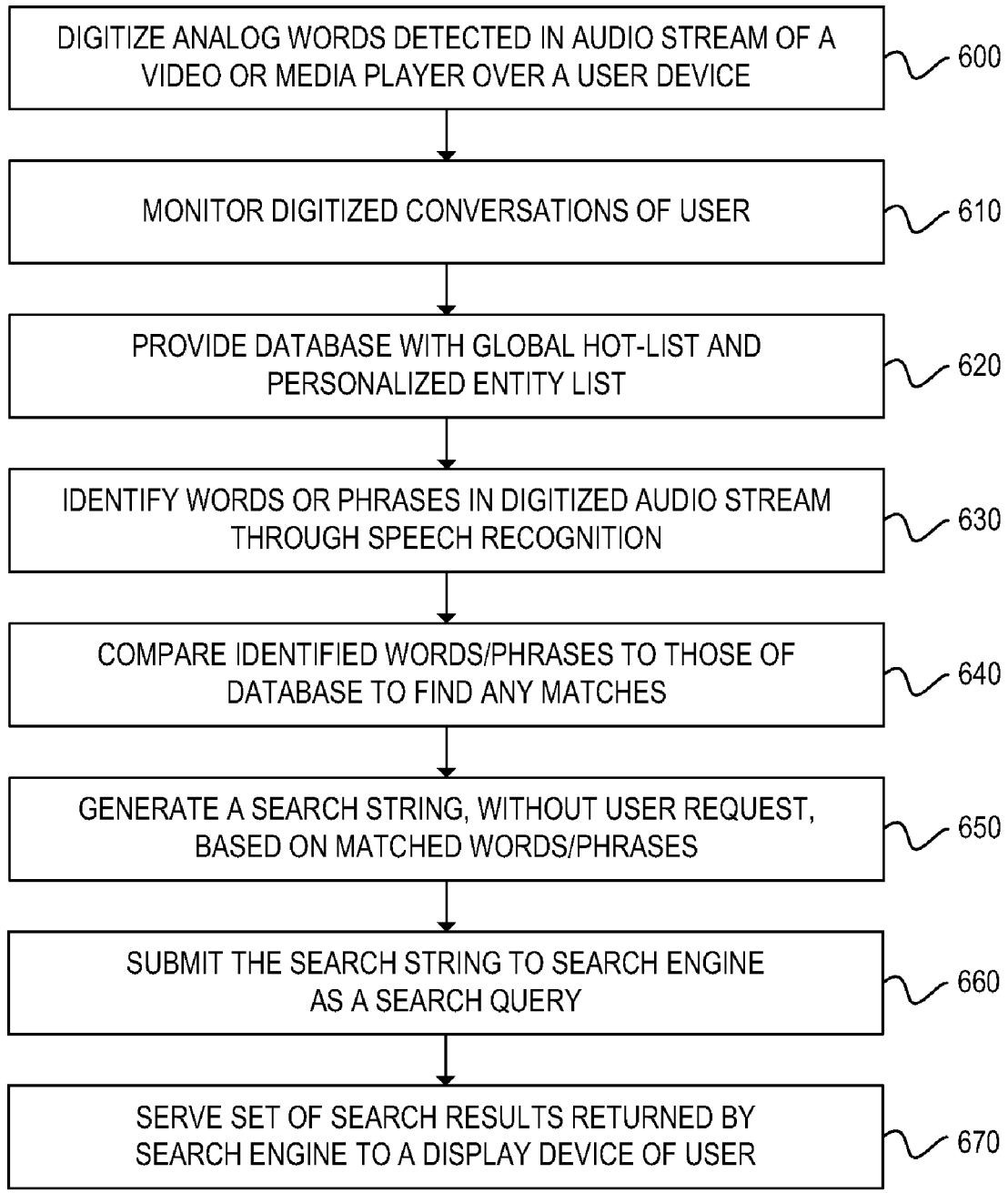
FIG. 6 is a flow chart of an embodiment of a method for automatically generating search queries based on words or phrases detected during streaming audio from media played over a media device.

FIG. 6 is a flow chart of an embodiment of a method for automatically generating search queries based on words or phrases detected during streaming audio from media played over a media device. The method, at block 600, digitizes any analog words detected in an audio stream of a video or other media played over a media device of a user. At block 610, the method monitors digitized conversations of the user and at least one other person. At block 620, the method provides a database containing a global hot-list including universal popular keywords or phrases and containing a personalized entity list including keywords and keyword phrases used with a frequency above a determined threshold value in the monitored conversations involving the user. At block 630, the method identifies words or phrases in the digitized audio stream through speech recognition. At block 640, the method compares the identified words or phrases to the keywords and keyword phrases in the database to find any matches. At block 650, the method generates a search string, without the user requesting a search, based on words or phrases found to match the keyword or keyword phrases stored in the database. At block 660, the method submits the search string to a search engine as a search query. At block 670, the method serves a set of search results returned by the search engine to a display device of the user.

In the foregoing description, numerous specific details of programming, software modules, user selections, network transactions, database queries, database structures, etc., are provided for a thorough understanding of various embodiments of the systems and methods disclosed herein. However, the disclosed system and methods can be practiced with other methods, components, materials, etc., or can be practiced without one or more of the specific details. In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations.

The order of the steps or actions of the methods described in connection with the disclosed embodiments may be changed as would be apparent to those skilled in the art. Thus, any order appearing in the Figures, such as in flow charts, or in the Detailed Description is for illustrative purposes only and is not meant to imply a required order.

Several aspects of the embodiments described are illustrated as software modules or components. As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc. that performs one or more tasks or implements particular abstract data types.

In certain embodiments, a particular software module may include disparate instructions stored in different locations of a memory device, which together implement the described functionality of the module. Indeed, a module may include a single instruction or many instructions, and it may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Various modifications, changes, and variations apparent to those of skill in the art may be made in the arrangement, operation, and details of the methods and systems disclosed. The embodiments may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware. Embodiments may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

The invention claimed is:

1. A computer-implemented method of generating search queries based on digitized audio from conversations, the method executable by a computer including a processor and memory, comprising:

providing a database stored in the memory containing a global hot-list comprising universal popular keywords or keyword phrases and containing a personalized entity list comprising keywords and keyword phrases used with a frequency above a determined threshold value in conversations involving a user;

monitoring a conversation between at least two people, at least one of which is the user;

identifying, by the processor, words or phrases in digitized audio of the monitored conversation through speech recognition;

comparing, by the processor, the identified words or phrases to the keywords and keyword phrases in the database to find any matches;

generating, by the processor, a search string, without the user requesting a search, based on words or phrases found to match the keyword or keyword phrases stored in the database;

submitting, by the computer, the search string to a search engine as a search query; and serving, by the computer, a set of search results returned by the search engine based on the submitted search string to a display device of the user.

2. The method of claim 1, wherein the conversations comprise conversations over telephones, the method further comprising:

sensing a contextual piece of information within the monitored conversation or as related to a status of one or more of the telephones; and integrating the contextual piece of information with the search string to narrow the submitted search query to the search engine, to thereby affect the search results thereof.

3. The method of claim 2, wherein the contextual piece of information comprises a location detected by a global positioning system (GPS) device located within the telephone, words uttered in proximity to the identified words within the search string, a time stamp, or a combination thereof.

4. The method of claim 1, wherein the conversations comprise conversations over telephones, the method further comprising:

storing in a search diary of the telephone of the user all of the results generated during the conversation; and making available the search diary to the user through a display of the telephone.

5. The method of claim 1, wherein the conversations comprise conversations over telephones, the method further comprising:
digitizing an audio stream of a video or other media being played on the telephone of the user; and
identifying words or phrases in the digitized audio stream through speech recognition.

6. The method of claim 1, wherein the personalized entity list comprises words selected from the group consisting of movies, contacts in an address book, favorite restaurants, favorite news types, favorite travel destinations, favorite foods, celebrities, and combinations thereof.

7. The method of claim 1, further comprising:
tracking a number of times a word or phrase is used in conversations involving the user; and
adding the word or phrase to the personalized entity list once the number of times it is used rises above the determined threshold value.

8. The method of claim 2, wherein the contextual piece of information comprises words uttered in proximity to the identified words within the search string.

9. A computer-implemented method of generating search queries based on a media audio stream played over a media device of a user, the method executable by a computer including a processor and memory, comprising:
digitizing any analog words detected in an audio stream of a video or other media played over a media device of a user;
monitoring digitized conversations of the user and at least one other person;
providing a database stored in the memory containing a global hot-list comprising universal popular keywords or phrases and containing a personalized entity list comprising keywords and keyword phrases used with a frequency above a determined threshold value in the monitored conversations involving the user;
identifying, by the processor, words or phrases in the digitized audio stream through speech recognition;
comparing, by the processor, the identified words or phrases to the keywords and keyword phrases in the database to find any matches;
generating, by the processor, a search string, without the user requesting a search, based on words or phrases found to match the keyword or keyword phrases stored in the database;
submitting, by the computer, the search string to a search engine as a search query; and
serving, by the computer, a set of search results returned by the search engine based on the submitted search string to a display of the media device of the user.

10. The method of claim 9, wherein the conversations comprise conversations over telephones, the method further comprising:
sensing a contextual piece of information within the audio stream or as related to a status of one or more of the telephones; and
inserting the contextual piece of information with the search string to narrow the automatically-submitted search query to the search engine, to thereby affect the search results thereof.

11. The method of claim 10, wherein the status of the telephone comprises a location detected by a global positioning system (GPS) device located within the telephone, a time stamp, or a combination thereof.

12. The method of claim 9, wherein the conversations comprise conversations over telephones, wherein the telephone of the user includes the media device, the method further comprising:
storing in a search diary of the telephone of the user all of the results generated during playing of the video or other media; and
making available the search diary to the user through a display of the telephone.

13. The method of claim 9, wherein the personalized entity list comprises words selected from the group consisting of movies, contacts in an address book, favorite restaurants, favorite news types, favorite travel destinations, favorite foods, celebrities, and combinations thereof.

14. The method of claim 9, further comprising:
tracking a number of times a word or phrase is used in conversations involving the user; and
adding the word or phrase to the personalized entity list once the number of times it is used rises above the determined threshold value.

15. A system for generating search queries based on digitized audio from a conversation between at least two people, at least one of which is a user, the system comprising:
a memory to store computer programmable code;
a processor to execute the computer programmable code stored in the memory;
a database to store entity lists comprising a global hot-list with universally popular keywords and keyword phrases and an entity list with keywords and keyword phrases used with a frequency above a determined threshold value in conversations involving the user;
an identifier to identify words or phrases in the digitized audio of the conversation between the user and at least one other person through speech recognition;
a comparator to compare the identified words or phrases to the keywords and keyword phrases stored in the database to locate any matches;
a search string generator to generate a search string, without the user requesting a search, based on words or phrases found to match the keyword or keyword phrases stored in the database;
wherein the processor:
submits the search string to a search engine as a search query; and
sends a set of search results returned by the search engine based on the submitted search string to a display device of the user.

16. The system of claim 15, wherein the conversations comprise conversations over telephones, wherein the search string generator detects a contextual piece of information within the monitored conversation or as related to a status of one or more of the telephones; and integrates the contextual piece of information with the search string to narrow the submitted search query to the search engine, to thereby affect the search results thereof.

17. The system of claim 16, wherein the contextual piece of information comprises a location detected by a global position system (GPS), words uttered in proximity to the identified words within the search string, a time stamp, or a combination thereof.

18. The system of claim 15, wherein the conversations comprise conversations over telephones, the system further comprising:
a search diary database to store a search diary of cumulative search results for the user over a period of telephone conversations, wherein the search diary is made available to the user through a website posted to the Internet.

19. The system of claim 15, wherein the personalized entity list comprises words selected from the group consisting of movies, contacts in an address book, favorite restaurants, favorite news types, favorite travel destinations, favorite foods, celebrities, and combinations thereof.

20. The system of claim 15, wherein the processor:
tracks a number of times a word or phrase is used in conversations involving the user;
increments a counter each time the word or phrase is detected; and
stores the word or phrase in the database once the counter for that word or phrase rises above a determined threshold value.

21. A system for generating search queries based on a media audio stream played over a telephone of a user, the system comprising:
a memory to store computer programmable code;
a processor to execute the computer programmable code stored in the memory;
a database to store entity lists comprising a global hot-list with universally popular keywords and keyword phrases and an entity list with keywords and keyword phrases used with a frequency above a determined threshold value in conversations involving the user;
a digitizer to digitize any analog words detected in an audio stream of a video or other media played over a telephone of the user;
an identifier to identify words or phrases in the digitized audio stream through speech recognition;
a comparator to compare the identified words or phrases to the keywords and keyword phrases stored in the database to locate any matches;
a search string generator to generate a search string, without the user requesting a search, based on words or phrases found to match the keyword or keyword phrases stored in the database;
wherein the processor:
submits the search string to a search engine as a search query; and
sends a set of search results returned by the search engine based on the submitted search string to the telephone of the user.

22. The system of claim 21, wherein the search string generator detects a contextual piece of information within the audio stream or as related to a status of the telephone; and integrates the contextual piece of information with the search string to narrow the automatically-submitted search query to the search engine, to thereby affect the search results thereof.

23. The system of claim 22, wherein the status of the telephone comprises a location detected by a global positioning system (GPS) device located within the telephone, a time stamp, or a combination thereof.

24. The system of claim 21, further comprising:
a search diary database to store a search diary of cumulative search results for the user over a period of telephone conversations, wherein the search diary is made available to the user through a website posted to the Internet.

25. The system of claim 21, wherein the personalized entity list comprises words selected from the group consisting of movies, contacts in an address book, favorite restaurants, favorite news types, favorite travel destinations, favorite foods, celebrities, and combinations thereof.

\* \* \* \* \*